US012652552B2

(12) United States Patent
Geng et al.

(10) Patent No.: US 12,652,552 B2
(45) Date of Patent: Jun. 9, 2026

(54) COMMUNICATION METHOD AND COMMUNICATION APPARATUS THEREOF

(71) Applicant: HUAWEI TECHNOLOGIES CO., LTD., Shenzhen (CN)

(72) Inventors: Tingting Geng, Shanghai (CN); Henrik Olofsson, Kista (SE); Yu Zeng, Shanghai (CN); Yedan Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 359 days.

(21) Appl. No.: 18/352,421

(22) Filed: Jul. 14, 2023

(65) Prior Publication Data

US 2023/0362686 A1 Nov. 9, 2023

Related U.S. Application Data

(63) Continuation of application No. PCT/CN2021/072296, filed on Jan. 15, 2021.

(51) Int. Cl.
*H04W 28/02* (2009.01)
*H04W 24/02* (2009.01)
*H04W 48/08* (2009.01)

(52) U.S. Cl.
CPC ........... *H04W 24/02* (2013.01); *H04W 48/08* (2013.01)

(58) Field of Classification Search
CPC ..... H04W 36/00; H04W 48/04; H04W 48/16; H04W 36/08; H04W 36/22; H04W 56/00; H04W 72/04; H04W 76/27; H04W 16/18; H04W 24/02; H04W 24/08; H04W 28/08;

H04W 36/14; H04W 36/30; H04W 4/00; H04W 48/00; H04W 48/02; H04W 48/14; H04W 52/02; H04W 72/02;
(Continued)

(56) References Cited

U.S. PATENT DOCUMENTS 10,681,636 B2 * 6/2020 Landais ............ H04W 52/0258

FOREIGN PATENT DOCUMENTS

| WO | WO-2019032888 A1 * | 2/2019 | ............. H04B 7/061 |
| WO | 2019137406 A1 | 7/2019 | |
| WO | 2020167236 A1 | 8/2020 | |
| WO | WO-2022031209 A1 * | 2/2022 | ........... H04B 7/0617 |

OTHER PUBLICATIONS

Huawei, (TP for SON BLCR for 38.473) Coverage and Capacity Optimization. 3GPP TSG-RAN WG3 Meeting #111-e, E-meeting, Jan. 25-Feb. 5, 2021, R3-210398, 15 pages.
(Continued)

*Primary Examiner* — Quan M Hua
(74) *Attorney, Agent, or Firm* — HAUPTMAN HAM, LLP

(57) ABSTRACT

In a communication method, a first network node sends a first message to a second network node, where the first message includes first configuration information. The first network node receives a second message from the second network node, where the second message includes second configuration information determined based on the first message. The first network node includes at least one of a packet data convergence protocol layer, a service data adaptation protocol layer, or a radio resource control protocol layer. The second network node includes at least one of a radio link control protocol layer, a media access control layer, or a physical layer.

20 Claims, 5 Drawing Sheets

(58) Field of Classification Search
CPC . H04W 72/0453; H04W 72/51; H04W 74/00;
H04W 74/08; H04W 76/18; H04W 76/28;
H04W 8/22; H04W 88/04; H04W 88/06;
H04W 88/10
See application file for complete search history.

(56) References Cited

OTHER PUBLICATIONS

Extended European Search Report issued in corresponding European Application No. 21918616.0, dated Jan. 17, 2024, pp. 1-11.
3GPP TSG-RAN WG3 Meeting #96 R3-171703,"F1 interface setup and the delivery of gNB-DU capability",Samsung,KT,SK Telecom,Hangzhou,P.R.China,May 15-19, 2017,total 4 pages.
3GPP TSG RAN WG3 Meeting #98 R3-174854,"Considerations for F1 Setup Procedure",KT Corp.Reno,NV, USA,Nov. 27-Dec. 1, 2017,total 2 pages.
3GPP TSG-RAN WG3 Meeting #110 R3-206388,"On F1/E1 bearer management aspects",Ericsson,Online,Nov. 2-12, 2020,total 5 pages.
Japanese Office Action issued in corresponding Japanese Application No. 2023-543042, dated Jul. 1, 2024, pp. 1-19.
Huawei, "R3-207031:CB:#1008_SONMDT_CCO-Summary of email discussion.", 3GPP TSG-RAN WG3 Meeting #110-e., Nov. 12, 2020, total 13 pages.
International Search Report issued in corresponding International Application No. PCT/CN2021/072296, dated Oct. 26, 2021, pp. 1-9.

* cited by examiner

COMMUNICATION METHOD AND COMMUNICATION APPARATUS THEREOF

CROSS-REFERENCE TO RELATED APPLICATIONS

This application is a continuation of International Application No. PCT/CN2021/072296, filed on Jan. 15, 2021, the disclosure of which is hereby incorporated by reference in its entirety.

TECHNICAL FIELD

This application relates to the communication field, and more specifically, to a communication method and a communication apparatus thereof that can be used for network capacity and coverage optimization.

BACKGROUND

In a 5G (5th Generation) communication system, a central unit (CU) node and a distributed unit (DU) node are introduced to a base station (gNB). In other words, an integrally deployed baseband unit (BBU) is divided into two parts: a CU and a DU.

For some wireless communication processes, for example, identification and optimization of a capacity and coverage optimization (CCO) problem, due to a change in a base station architecture, in a CU-DU split architecture, a specific processing process and function implementation is to be redesigned.

SUMMARY

Embodiments of this application disclose a communication method and a communication apparatus thereof, so that in a 5G radio access network system, when some functions of a base station are separated into two network nodes, a function of capacity and coverage optimization is implemented.

A first aspect of embodiments of this application discloses a communication method, including: A first network node sends a first message to a second network node, where the first message includes first configuration information. The first network node receives a second message from the second network node, where the second message includes second configuration information determined based on the first message. The first network node includes at least one of a packet data convergence protocol layer, a service data adaptation protocol layer, and a radio resource control protocol layer. The second network node includes at least one of a radio link control protocol layer, a media access control layer, and a physical layer. In this way, the second network node may determine the second configuration information based on the first message from the first network node, so that the first network node and the second network node cooperate with each other to implement a function of capacity and coverage optimization.

In a possible implementation, the first configuration information includes one or more groups of beam synchronization signal block capacity and coverage optimization (SSB CCO) configuration information determined by the first network node. The second network node selects one group of SSB CCO configuration information from the one or more groups of SSB CCO configuration information. In this way, the first network node and the second network node cooperate with each other to implement the function of capacity and coverage optimization.

In another possible implementation, the first configuration information includes one or more groups of cell capacity and coverage optimization (cell CCO) configuration information determined by the first network node. In this way, the second network node may select, from the one or more groups of cell CCO configuration information, one group of cell CCO configuration information or one group of cell CCO configuration information and a plurality of pieces of SSB CCO configuration information corresponding to the cell CCO configuration information, so that the first network node and the second network node cooperate with each other to implement the function of capacity and coverage optimization.

In another possible implementation, the first message further includes priority information, and the priority information indicates a priority of the one or more groups of SSB CCO configuration information; and/or the priority information indicates a priority of the one or more groups of cell CCO configuration information. In this way, the second network node may select, with reference to the priority information, one group of cell CCO configuration information, and/or one or more groups of SSB CCO configuration information corresponding to the group of cell CCO configuration information, or one group of SSB CCO configuration information.

In another possible implementation, the first message further includes first indication information, and the first indication information indicates a network capacity and coverage problem. Therefore, the second network node may determine, with reference to the first indication information, one group of cell CCO configuration information, and/or one or more groups of SSB CCO configuration information corresponding to the group of cell CCO configuration information, or one group of SSB CCO configuration information.

In another possible implementation, the first message further includes second indication information, and the second indication information indicates information for identifying the network capacity and coverage problem. In this way, the first network node may send, to the second network node, the information for identifying the network capacity and coverage problem, so that the second network node can better select or determine the cell CCO configuration information or the SSB CCO configuration information.

In another possible implementation, the second configuration information includes a first group of cell CCO configuration information and/or a first group of SSB CCO configuration information, where the one or more groups of SSB CCO configuration information determined by the first network node include the first group of SSB CCO configuration information, and the one or more groups of cell CCO configuration information determined by the first network node include the first group of SSB CCO configuration information.

Alternatively, the second configuration information includes: identification information of a first group of cell CCO configuration information, and/or identification information corresponding to a first group of SSB CCO configuration information, where the one or more groups of SSB CCO configuration information determined by the first network node include the first group of cell CCO configuration information, and the one or more groups of cell CCO configuration information determined by the first network node include the first group of cell CCO configuration information.

In another possible implementation, the second configuration information includes a second group of cell CCO configuration information and/or a second group of SSB CCO configuration information, where the second group of cell CCO configuration information and/or the second group of cell CCO configuration information are/is determined by the second network node.

Alternatively, the second configuration information includes: identification information corresponding to a second group of cell CCO configuration information and/or identification information corresponding to a second group of SSB CCO configuration information, where the second group of cell CCO configuration information and/or the second group of SSB CCO configuration information are/is determined by the second network node.

In another possible implementation, before the first network node sends the first message to the second network node, the method further includes: The first network node identifies the network capacity and coverage problem.

In another possible implementation, before the first network node identifies the network coverage problem, the method further includes: The first network node or the second network node receives radio resource configuration information sent by a third network node, where the radio resource configuration information includes at least one of the following: an initial cell coverage state, an initial SSB coverage state, a cell coverage state range, an SSB coverage state range, a mapping relationship between SSB CCO configuration information and a cell coverage state, a mapping relationship between SSB CCO configuration information and cell CCO configuration information, or a mapping relationship between SSB radio resource configuration and an SSB cell coverage state.

In another possible implementation, the first network node and the second network node belong to a same base station.

According to the communication method shown in the first aspect of this application, when some functions of the base station are separated into two network nodes, the function of capacity and coverage optimization may be implemented through cooperation between the two network nodes.

A second aspect of embodiments of this application provides a network device, used in a first network node, where the network device includes a memory and a processor. The memory is configured to store instructions, and the processor is configured to invoke the instructions in the memory, to perform operations in the method in any one of the first aspect or the possible implementations of the first aspect.

A third aspect of embodiments of this application discloses a communication method, including: A second network node receives a first message sent by a first network node, where the first message includes first configuration information. The second network node sends a second message to the first network node, where the second message includes second configuration information determined based on the first message. The first network node includes at least one of a packet data convergence protocol layer, a service data adaptation protocol layer, and a radio resource control protocol layer, and the second network node includes at least one of a radio link control protocol layer, a media access control layer, and a physical layer. In this way, the second network node may determine the second configuration information based on the first message from the first network node, so that the first network node and the second network node cooperate with each other to implement a function of capacity and coverage optimization.

In a possible implementation, the first configuration information includes one or more groups of beam synchronization signal block capacity and coverage optimization (SSB CCO) configuration information, and the one or more groups of SSB CCO configuration information is determined by the first network node. The second network node selects one group of SSB CCO configuration information from the one or more groups of SSB CCO configuration information. In this way, the first network node and the second network node cooperate with each other to implement the function of capacity and coverage optimization.

In another possible implementation, the first configuration information further includes one or more groups of cell CCO configuration information, and the one or more groups of cell CCO configuration information is determined by the first network node. In this way, the second network node may select, from the one or more groups of cell CCO configuration information, one group of cell CCO configuration information or one group of cell CCO configuration information and a plurality of pieces of SSB CCO configuration information corresponding to the cell CCO configuration information, so that the first network node and the second network node cooperate with each other to implement the function of capacity and coverage optimization.

In another possible implementation, the first message includes priority information, and the priority information indicates a priority of the one or more groups of SSB CCO configuration information; and/or the priority information indicates a priority of the one or more groups of cell CCO configuration information. In this way, the second network node may select, with reference to the priority information, one group of cell CCO configuration information, and/or one or more groups of SSB CCO configuration information corresponding to the group of cell CCO configuration information, or one group of SSB CCO configuration information.

In another possible implementation, the first message further includes first indication information, and the first indication information indicates a network capacity and coverage problem. Therefore, the second network node may determine, with reference to the first indication information, one group of cell CCO configuration information, and/or one or more groups of SSB CCO configuration information corresponding to the group of cell CCO configuration information, or one group of SSB CCO configuration information.

In another possible implementation, the first message further includes second indication information, and the second indication information indicates information for identifying the network capacity and coverage problem. In this way, the second network node may better select or determine the cell CCO configuration information or the SSB CCO configuration information based on the information about the network capacity and coverage problem.

In another possible implementation, the second configuration information includes a first group of cell CCO configuration information and/or a first group of SSB CCO configuration information, where the one or more groups of SSB CCO configuration information determined by the first network node include the first group of SSB CCO configuration information, and the one or more groups of cell CCO configuration information determined by the first network node include the first group of cell CCO configuration information.

Alternatively, the second configuration information includes: identification information of a first group of cell CCO configuration information, and/or identification information corresponding to a first group of SSB CCO configuration information, where the one or more groups of SSB CCO configuration information determined by the first network node include the first group of cell CCO configuration information, and the one or more groups of cell CCO configuration information determined by the first network node include the first group of cell CCO configuration information.

In another possible implementation, the second configuration information includes a second group of cell CCO configuration information and/or a second group of SSB CCO configuration information, where the second group of cell CCO configuration information and/or the second group of SSB CCO configuration information are/is determined by the second network node.

Alternatively, the second configuration information includes: identification information corresponding to a second group of cell CCO configuration information and/or identification information corresponding to a second group of SSB CCO configuration information, where the second group of cell CCO configuration information and/or the second group of SSB CCO configuration information are/is determined by the second network node.

In another possible implementation, before the first network node sends the first message to the second network node, the method further includes: The first network node identifies the network capacity and coverage problem.

In another possible implementation, before the first network node identifies the network coverage problem, the method further includes: The first network node or the second network node receives radio resource configuration information sent by a third network node, where the radio resource configuration information includes at least one of the following: an initial cell coverage state, an initial SSB coverage state, a cell coverage state range, an SSB coverage state range, a mapping relationship between SSB CCO configuration information and a cell coverage state, a mapping relationship between SSB CCO configuration information and cell CCO configuration information, or a mapping relationship between SSB radio resource configuration and an SSB cell coverage state.

In another possible implementation, the first network node and the second network node belong to a same base station.

According to the communication method in at least one embodiment of this application, the function of capacity and coverage optimization may be implemented through cooperation between the two network nodes.

A fourth aspect of embodiments of this application provides a network device, used in a second network node, where the network device includes a memory and a processor. The memory is configured to store instructions, and the processor is configured to invoke the instructions in the memory, to perform operations in the method in any one of the third aspect or the possible implementations of the third aspect.

A fifth aspect of embodiments of this application discloses a communication method, including: A first network node sends a first message to a second network node, where the first message includes first indication information, and the first indication information indicates information about a network capacity and coverage problem. The first network node receives a second message from the second network node, where the second message includes configuration information that is determined based on the first message and that is used for network capacity and coverage optimization. The first network node includes at least one of a packet data convergence protocol layer, a service data adaptation protocol layer, and a radio resource control protocol layer, and the second network node includes at least one of a radio link control protocol layer, a media access control layer, and a physical layer.

In a possible implementation, the first message further includes second indication information, and the second indication information indicates information for identifying the network capacity and coverage problem.

In another possible implementation, the second message includes: cell CCO configuration information and/or SSB CCO configuration information, and the cell CCO configuration information and the SSB CCO configuration information are determined by the second network node.

In another possible implementation, before the first network node sends the first message to the second network node, the communication method further includes: The first network node identifies the network capacity and coverage problem.

In another possible implementation, before the first network node identifies the network capacity and coverage problem, the communication method further includes: The first network node or the second network node receives radio resource configuration information sent by a third network node, where the radio resource configuration information includes at least one of the following: an initial cell coverage state, an initial SSB coverage state, a cell coverage state range, an SSB coverage state range, a mapping relationship between SSB CCO configuration information and a cell coverage state, a mapping relationship between SSB CCO configuration information and cell CCO configuration information, or a mapping relationship between SSB radio resource configuration and an SSB cell coverage state.

In another possible implementation, the first network node and the second network node belong to a same base station.

According to the communication method in at least one embodiment of this application, the function of capacity and coverage optimization may be implemented through cooperation between the two network nodes.

A sixth aspect of embodiments of this application provides a network device, used in a first network node, where the network device includes a memory and a processor. The memory is configured to store instructions, and the processor is configured to invoke the instructions in the memory, to perform operations in the method in any one of the fifth aspect or the possible implementations of the fifth aspect.

A seventh aspect of embodiments of this application discloses a communication method, including: A second network node receives a first message sent by a first network node, where the first message includes first indication information, and the first indication information indicates information about a network capacity and coverage problem. The second network node sends a second message to the second network node, where the second message includes configuration information that is determined based on the first message and that is used for network capacity and coverage optimization. The first network node includes at least one of a packet data convergence protocol layer, a service data adaptation protocol layer, and a radio resource control protocol layer, and the second network node includes at least one of a radio link control protocol layer, a media access control layer, and a physical layer.

In a possible implementation, the first message further includes second indication information, and the second indication information indicates information for identifying the network capacity and coverage problem.

In still another possible implementation, the second message includes cell CCO configuration information and/or SSB CCO configuration information, and the cell CCO configuration information and the SSB CCO configuration information are determined by the second network node.

In another possible implementation, before the first network node sends the first message to the second network node, the communication method further includes: The first network node identifies the network capacity and coverage problem.

In another possible implementation, before the first network node identifies the network capacity and coverage problem, the communication method further includes: The first network node or the second network node receives radio resource configuration information sent by a third network node, where the radio resource configuration information includes at least one of the following: an initial cell coverage state, an initial SSB coverage state, a cell coverage state range, an SSB coverage state range, a mapping relationship between SSB CCO configuration information and a cell coverage state, a mapping relationship between SSB CCO configuration information and cell CCO configuration information, or a mapping relationship between SSB radio resource configuration and an SSB cell coverage state.

In another possible implementation, the first network node and the second network node belong to a same base station.

According to the communication method in at least one embodiment of this application, the function of capacity and coverage optimization may be implemented through cooperation between the two network nodes.

An eighth aspect of embodiments of this application provides a network device, used in a second network node, where the network device includes a memory and a processor. The memory is configured to store instructions, and the processor is configured to invoke the instructions in the memory, to perform operations in the method in any one of the seventh aspect or the possible implementations of the seventh aspect.

A ninth aspect of embodiments of this application provides a communication apparatus. The communication apparatus is used in a first network node, and includes a module configured to perform the method described in the first aspect or the possible implementations of the first aspect.

A tenth aspect of embodiments of this application provides a communication apparatus. The communication apparatus is used in a second network node, and includes a module configured to perform the method described in the third aspect or the possible implementations of the third aspect.

An eleventh aspect of embodiments of this application provides a communication apparatus. The communication apparatus is used in a first network node, and includes a module configured to perform the method described in the fifth aspect or the possible implementations of the fifth aspect.

A twelfth aspect of embodiments of this application provides a communication apparatus. The communication apparatus is used in a second network node and includes a module configured to perform the method described in the seventh aspect or the possible implementations of the seventh aspect.

A thirteenth aspect of embodiments of this application provides a communication apparatus. The communication apparatus is used in a first network node and includes a processor and an interface circuit. The interface circuit is configured to: receive a signal from an apparatus other than the apparatus and transmit the signal to the processor, or send a signal from the processor to an apparatus other than the apparatus. The processor is configured to implement, by using a logic circuit or executing code instructions, the method described in the first aspect or the possible implementations of the first aspect.

A fourteenth aspect of embodiments of this application provides a communication apparatus. The communication apparatus is used in a second network node and includes a processor and an interface circuit. The interface circuit is configured to: receive a signal from an apparatus other than the apparatus and transmit the signal to the processor, or send a signal from the processor to an apparatus other than the apparatus. The processor is configured to implement, by using a logic circuit or executing code instructions, the method described in the third aspect or the possible implementations of the third aspect.

A fifteenth aspect of embodiments of this application provides a communication apparatus. The communication apparatus is used in a first network node and includes a processor and an interface circuit. The interface circuit is configured to: receive a signal from an apparatus other than the apparatus and transmit the signal to the processor, or send a signal from the processor to an apparatus other than the apparatus. The processor is configured to implement, by using a logic circuit or executing code instructions, the method described in the fifth aspect or the possible implementations of the fifth aspect.

A sixteenth aspect of embodiments of this application provides a communication apparatus. The communication apparatus is used in a second network node and includes a processor and an interface circuit. The interface circuit is configured to: receive a signal from an apparatus other than the apparatus and transmit the signal to the processor, or send a signal from the processor to an apparatus other than the apparatus. The processor is configured to implement, by using a logic circuit or executing code instructions, the method described in the seventh aspect or the possible implementations of the seventh aspect.

A seventeenth aspect of embodiments of this application provides a non-transistory computer-readable storage medium. The computer-readable storage medium stores a computer program or instructions. When the computer program or the instructions are executed by a communication apparatus, the method according to the first aspect or the possible implementations of the first aspect, or the method according to the third aspect or the possible implementations of the third aspect, or the method according to the fifth aspect or the possible implementations of the fifth aspect, or the method according to the seventh aspect or the possible implementations of the seventh aspect is implemented.

An eighteenth aspect of embodiments of this application provides a computer program product. When the computer program product is executed by a communication apparatus, the method according to the first aspect or the possible implementations of the first aspect, or the method according to the third aspect or the possible implementations of the third aspect, or the method according to the fifth aspect or the possible implementations of the fifth aspect, or the method according to the seventh aspect or the possible implementations of the seventh aspect is implemented.

A nineteenth aspect of embodiments of this application provides a communication system, where the communication system includes one or more of the following: the communication apparatus according to any one of the ninth aspect to the sixteenth aspect. Alternatively, the communication system includes the first network node and the second network node according to the first aspect to the eighth aspect.

DESCRIPTION OF EMBODIMENTS

Figure 1:
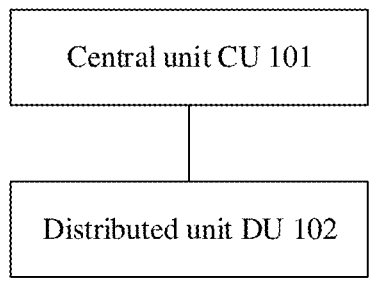
FIG. 1 is a schematic diagram of an application scenario of a technical solution according to at least one embodiment of this application.

The following describes embodiments of this application with reference to the accompanying drawings in embodiments of this application.

The following describes some terms in embodiments of this application, to facilitate understanding by a person of ordinary skill in the art.

(1) A terminal device is a device having a wireless transceiver function. The terminal device may be deployed on land, and includes an indoor device, an outdoor device, a hand-held device, or a vehicle-mounted device. The terminal may also be deployed on a water surface (for example, on a ship), and may also be deployed in air (for example, in an airplane, a balloon, or a satellite). The terminal device may be a mobile phone (mobile phone), a tablet computer (pad), a computer having a wireless transceiver function, a virtual reality (virtual reality, VR) terminal device, an augmented reality (augmented reality, AR) terminal device, a wireless terminal device in industrial control (industrial control), a wireless terminal device in self driving (self driving), a wireless terminal device in telemedicine (remote medical), a wireless terminal device in a smart grid (smart grid), a wireless terminal device in transportation safety (transportation safety), a wireless terminal device in a smart city (smart city), or a wireless terminal device in a smart home (smart home). The terminal device may further include user equipment (UE) and the like.

(2) A network device in this application may be a device in a wireless network, for example, a node that connects the terminal device to a radio access network (RAN) in the wireless network. Currently, examples of some RAN nodes are a next generation NodeB (gNB), a transmission reception point (TRP), an evolved NodeB (eNB), a baseband unit (BBU), a wireless fidelity (Wi-Fi) access point (AP), an integrated access and backhaul (IAB), or the like in a 5th generation (5G) NR system (also briefly referred to as an NR system).

In embodiments of this application, an apparatus configured to implement the functions of the network device may be the network device, or may be an apparatus that can support the network device in implementing all or some necessary functions of the network device, for example, may be a chip system, may be board hardware, or may be an entity including software and hardware. The apparatus may be installed in the network device. In the technical solutions provided in embodiments of this application, the technical solutions provided in embodiments of this application are described by using an example in which the apparatus configured to implement the function of the network device is the network device.

It should be understood that sequence numbers of the foregoing processes do not mean execution sequences in embodiments of this application. The execution sequences of the processes are determined based on functions and internal logic of the processes, and should not be construed as any limitation on the implementation processes of embodiments of this application.

It should be understood that, the terms "system" and "network" in this application are usually used interchangeably in this specification. It should be understood that, the term "and/or" in embodiments of this application describes an association relationship for describing associated objects and represents that three relationships may exist. For example, A and/or B may represent the following three cases: Only A exists, both A and B exist, and only B exists. It should be understood that, the character "/" in embodiments of this application generally indicates an "or" relationship between the associated objects.

It should be understood that, in embodiments of this application, "A indicates B" may indicate that A directly includes B, or may indicate that A indicates B by using a mapping relationship.

It should be understood that, in embodiments of this application, "at least one" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

It should be understood that, in embodiments of this application, terms are generally numbered for ease of differentiation, and the numbers do not mean that there is a difference between a sequence or a priority of the terms. For example, in "first group of information" and "second group of information", "first" and "second" are usually used only to distinguish between the two groups of information, and should not constitute a limitation on an implementation process of embodiments of this application.

As shown in FIG. 1, in a network structure in at least one embodiment of this application, an example in which a network device is a gNB in an NR system is used. The network device may include a central unit (CU) 101 and a distributed unit (DU) 102. For example, the network device may include a radio resource control (RRC) protocol layer and a function thereof, a packet data convergence protocol (PDCP) protocol layer and a function thereof, a service data adaptation protocol (SDAP) protocol layer and a function thereof, a radio link control (RLC) protocol layer and a function thereof, a media access control (MAC) protocol layer and a function thereof, and a physical layer PHY and a function thereof. The CU may include all or some protocol layer functions of the network device, for example, the CU has an RRC protocol layer and a function thereof, a PDCP protocol layer and a function thereof, and an SDAP protocol layer and a function thereof. In some other implementations, the CU may further include an RRC protocol layer, a PDCP protocol layer, and an RLC protocol layer. Alternatively, the CU may include an RRC protocol layer, a PDCP protocol layer, and a MAC protocol layer, or even may include some or all physical layer PHY functions. Similarly, the DU may also be implemented to have all or some protocol layer functions of the network device. For example, the DU may include an RLC protocol layer and a function thereof, a MAC protocol layer and a function thereof, and a PHY protocol layer and a function thereof. Protocol layers specifically included in the CU and the DU and functions of the protocol layers are not limited in at least one embodiment of this application.

Figure 2:
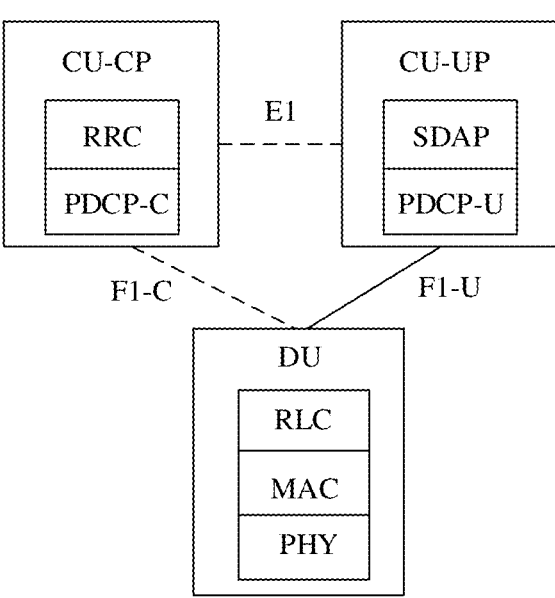
FIG. 2 is a schematic diagram of another application scenario of a technical solution according to at least one embodiment of this application.

Based on FIG. 1, as shown in FIG. 2, the CU may be further divided into a CU-control plane (CU-CP) entity and a CU-user plane (CU-UP) entity. The CU-CP entity is responsible for control plane functions, including an RRC protocol layer and functions thereof, and a packet data convergence protocol-control plane (PDCP-C) protocol layer and a function thereof. For example, the RRC protocol layer is mainly responsible for system message broadcast, RRC connection management, access layer security management, radio resource management, and mobility management. The PDCP-C is mainly responsible for operations such as encryption and decryption of control plane data, integrity protection, and data transmission. The CU-UP is responsible for user plane functions, including an SDAP protocol layer and a function thereof and a packet data convergence protocol-user plane (PDCP-U) protocol layer and a function thereof. For example, the SDAP is mainly responsible for operations such as processing data of a core network and mapping a flow to a bearer. The PDCP-U is mainly responsible for encryption and decryption of a data plane, integrity protection, header compression, serial numbers maintenance, and data transmission. As shown in FIG. 2, the CU-CP and the CU-UP may communicate with each other through an E1 interface. The CU-CP and the DU communicate with each other through an F1 control plane interface (F1-C). The CU-UP and the DU communicate with each other through an F1 user plane interface (F1-U).

In a CU-DU architecture, a radio resource configuration parameter of a cell is generally adjusted by a DU, but a coverage problem or a load problem of the cell is generally detected by a CU. The DU makes a decision on a configuration parameter of a radio resource. Because the DU is more aware of a configuration state of a radio resource parameter of the cell, for example, transmit power, an antenna angle, an SSB direction, and a cell resource usage state. The CU has global perception on all cells managed by the CU and corresponding neighboring cells, and can better perform coordination between neighboring cells. The CU does not know a configuration state of the radio resource parameter of the cell or knows only some information. For example, the DU adjusts the transmit power in the coverage parameter, and sends transmit power information to the CU. The CU may not understand a relationship between the transmit power and coverage. The CU further sends the parameter to the neighboring cell, and the CU and the DU of the neighboring cell may not understand the parameter either. As a result, the cells cannot determine their respective coverage configurations that need to be adjusted. To resolve the foregoing problem, embodiments of this application provide the following solutions.

Figure 3:
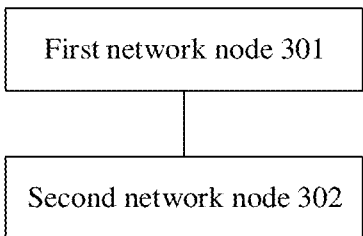
FIG. 3 is a schematic block diagram of an application scenario of a technical solution according to at least one embodiment of this application.

FIG. 3 is a schematic diagram of an application scenario of a technical solution according to at least one embodiment of this application. In the application scenario, a radio access network system includes two network devices: a first network node and a second network node. It may be understood that the first network node in at least one embodiment of this application may be the CU in FIG. 1 or FIG. 2, and the second network node is the DU in FIG. 1 or FIG. 2. The following describes at least one embodiment of this application by using an example of operations performed by the first network node and the second network node. It may be understood that the first network node in at least one embodiment of this application may alternatively be a CU-CP, and the second network node may be a DU or a CU-UP.

Figure 4:
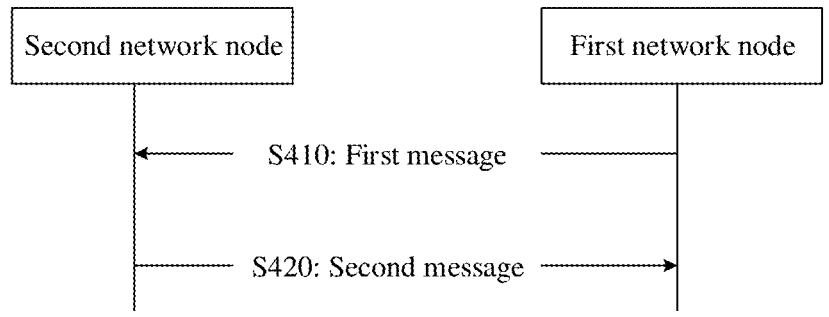
FIG. 4 is a schematic flowchart of a communication method according to at least one embodiment of this application.

Based on the application scenario shown in FIG. 3, FIG. 4 is a schematic flowchart of a communication method 400 according to at least one embodiment of this application. The method 400 includes but is not limited to the following steps.

S410: A first network node sends a first message to a second network node, where the first message includes first configuration information.

As described below in at least one embodiment, the first message may include at least one of the following information: one or more groups of cell CCO configuration information and/or one or more groups of SSB CCO configuration information of one or more cells, priority information, gain information, first indication information, second indication information, or third indication information.

For example, the first configuration information may include one or more groups of SSB CCO configuration information determined by the first network node. Alternatively, the first configuration information is one or more groups of SSB CCO configuration information that are determined by the first network node and that are of the one or more cells.

Optionally, the first configuration information may further include one or more groups of cell CCO configuration information of the one or more cells. The one or more groups of cell CCO configuration information of the one or more cells are determined by the first network node, and are sent by the first network node to the second network node.

For example, the first message may further include the priority information, and the priority information indicates a priority of the one or more groups of cell CCO configuration information and/or the one or more groups of SSB CCO configuration information that are determined by the first network node and that are of the one or more cells. The second network node may select one group of cell CCO configuration information and/or one or more groups of SSB CCO configuration information from the one or more groups of cell CCO configuration information and/or the one or more groups of SSB CCO configuration information of the one or more cells based on the priority information.

Optionally, the first message may further include the gain information, and the gain information indicates possible gain effect of the one or more groups of cell CCO and/or SSB CCO configuration information that are determined by the first network node and that are of the one or more cells. The second network node may select one group of optimal cell CCO and/or SSB CCO configuration information from the one or more groups of cell CCO and/or SSB CCO configuration information of the one or more cells based on the gain information.

Optionally, the first message may further include the first indication information, and the first indication information indicates a network capacity and coverage optimization (CCO) problem. For example, the first indication information sent by the first network node to the second network node may include problem type information and/or problem description information related to CCO. The problem type information may include at least one of the following problem types: weak coverage, a coverage hole, overshoot coverage, overshooting coverage, an interference problem, unbalanced uplink and downlink coverage, or another problem type. The problem description information describes a detailed CCO problem. The problem description information may include at least one of information such as orientation information, geographical location information, distance information, occurrence time, a problem severity level, and a problem cell and/or SSB information of a coverage problem. The orientation information, the geographical location information, the distance information, and the like of the coverage problem may enable the second network node to determine SSB information indicating that the coverage problem occurs. The occurrence time of the coverage problem may enable the second network node to determine a time period in which coverage optimization needs to be performed. The severity level of the coverage problem may enable the second network node to determine an adjusted radio resource parameter range. The problem cell and/or SSB information may indicate information about a cell and/or SSB having a CCO problem, for example, cell identifier information and SSB identifier information, so that the second network node can determine the cell and/or SSB having the CCO problem. Optionally, the problem cell and/or SSB information may further indicate a CCO problem occurrence scenario. For example, the problem cells include a cell 1 and a cell 2, and the occurrence scenario may be "from the cell 1 to the cell 2", "from the cell 2 to the cell 1", or "bidirectional movement".

Optionally, the first message may further include the second indication information, and the second indication information indicates information for identifying the network capacity and coverage problem. For example, the second indication information includes at least one of report information such as coverage measurement information, a measurement report, a mobility-related report (for example, a radio link failure report, a successful handover report, or another report), a connection failure report, and a random access report.

Optionally, the first message may further include the third indication information, and the third indication information may be cell CCO configuration information and/or SSB CCO configuration information of a neighboring cell. The second network node may better determine, based on the third indication information, the cell CCO configuration information and/or the SSB CCO configuration information of the cell managed by the second network node.

It should be understood that the cell CCO configuration information, the SSB CCO configuration information, the priority information, the gain information, the first indication information, the second indication information, and the third indication information may be carried in a same message for sending, for example, the first message, or may be included in different messages sent by the first network node to the second network node. This is not limited in at least one embodiment of this application.

For example, the cell CCO configuration information includes at least one of the following information elements shown in Table 1:

TABLE 1

| Cell Coverage Modification | Cell coverage modification |
| --- | --- |
| >CGI | Coverage modification cell information. A cell global identifier (CGI) is used as an example. |
| >Cell Coverage State | Cell coverage state. For example, 0 indicates that a cell is not activated, and other values indicate cell coverage configuration. |
| >Cell Deployment Status Indicator | Cell deployment state indicator, used to indicate a cell coverage state to be used in a next coverage modification |
| >Cell Replacing Info | Cell replacing information, used to indicate configuration of coverage modification next time |
| >Replacing Cells | Replaced cell |
| >>>CGI | Cell global identifier, a cell identifier used to replace part or all of coverage of a coverage modification cell |

For example, the SSB CCO configuration information includes at least one of information elements shown in Table 2:

TABLE 2

| SSB Coverage Modification | SSB coverage modification |
| --- | --- |
| >SSB ID | SSB identifier, used to indicate an SSB identifier for coverage modification |
| >SSB Coverage State | SSB coverage modification state. For example, a value 0 indicates that an SSB is not activated, and other values indicate SSB coverage configuration. |
| >SSB Deployment Status Indicator | SSB deployment state indicator, used to indicate an SSB coverage state to be used in a next coverage modification |
| >SSB Replacing Info | SSB replacing information, used to indicate configuration of coverage modification next time |
| >Replacing SSBs | Replaced SSB |
| >>>SSB ID | SSB identifier, an SSB identifier used to indicate to replace part or all of coverage of a coverage modification SSB |

If the first network node sends the one or more groups of SSB CCO configuration information to the second network node, cell information corresponding to the one or more groups of SSB CCO configuration information may be further indicated. The cell information may include at least one of a cell global identifier (CGI), a physical cell identifier (PCI) and a frequency, a cell identifier (cell ID), a non-public network identifier (NPN ID), a non-terrestrial network identifier (NTN ID), or another cell identifier of a cell. The CGI may include a public land mobile network (PLMN ID) and a cell ID. Optionally, the cell information may be cell information corresponding to a cell accessed by the terminal device, or may be information about a first cell in information about at least one cell sent by a cell accessed by the terminal device.

It may be understood that, if the first network node may send a plurality of groups of cell CCO configuration information and/or a plurality of groups of SSB CCO configuration information of one or more cells to the second network node, the first network node may also indicate, to the second network node, first index information of the cell CCO configuration information, and/or second index information of the SSB CCO configuration information, or at least one group of cell CCO configuration information and/or third index information of at least one group of SSB CCO configuration information of at least one cell.

In an example, the first message sent by the first network node to the second network node may include at least one of the following information shown in Table 3:

TABLE 3

| Recommended Coverage Modification Item | Recommended coverage modification item |
|---|---|
| >Coverage Modification Index | Index information (for example, third index information) |
| >Coverage Issue Information | Information about a coverage problem |
| >Coverage Modification Benefit | Gain information |
| >Cell Modification list | Cell modification list |
| >>Cell modification Item | Cell modification item |
| >>Cell Identity | Cell identifier, for example, CGI |
| >>Cell Coverage State | Cell coverage state |

It may be understood that at least one of the information shown in Table 3 may also be sent to the second network node by using another message instead of the first message.

In an implementation, one group of cell CCO configuration information may correspond to the at least one group of SSB CCO configuration information. Correspondingly, the first network node may indicate joint index information (referred to as fourth index information below for ease of citation) of the cell CCO configuration information and the SSB CCO configuration information by using the first message or independently.

S420: The second network node sends a second message to the first network node, where the second message includes second configuration information determined by the second network node based on the first message.

For example, the second configuration information includes a first group of cell CCO configuration information and/or a first group of SSB CCO configuration information determined by the second network node. The one or more groups of SSB CCO configuration information determined by the first network node in step S410 include the first group of SSB CCO configuration information. The one or more groups of cell CCO configuration information determined by the first network node include the first group of cell CCO configuration information. Alternatively, the second configuration information includes: identification information of a first group of cell CCO configuration information, and/or identification information corresponding to a first group of SSB CCO configuration information, where the one or more groups of SSB CCO configuration information determined by the first network node include the first group of cell CCO configuration information, and the one or more groups of cell CCO configuration information determined by the first network node include the first group of cell CCO configuration information.

Optionally, the second configuration information may include index information corresponding to the CCO configuration information received by the second network node. The CCO configuration information may be at least one group of cell CCO configuration information and/or at least one group of SSB CCO configuration information of at least one cell. The index information may be at least one of the first index information, the second index information, the third index information, or the fourth index information in step S410. CCO configuration information corresponding to the index information is provided by the first network node, sent by the first network node to the second network node, and selected and determined by the second network node.

Optionally, if the first network node does not send the explicit index information to the second network node, the second network node may determine, based on a sequence of the accepted CCO configuration information in the at least one group of CCO configuration information, index information corresponding to an accepted CCO configuration information. For example, the first network node sends three groups of cell CCO configuration information. If the second network node determines that a last group of cell CCO configuration information is the second configuration information, the second network node may indicate, to the first network node, that index information is 3 (for example, default index information of the cell CCO configuration information is 1, 2, 3) or 2 (for example, default index information of the cell CCO configuration information is 0, 1, 2) or corresponding index information in another index calculation manner predefined in a protocol. The CCO configuration information includes at least one group of cell CCO configuration information and/or at least one group of SSB CCO configuration information.

Optionally, the second configuration information may further include a second group of cell CCO configuration information and/or a second group of SSB CCO configuration information. The second group of cell CCO configuration information and/or the second group of SSB CCO configuration information are/is determined by the second network node. Alternatively, the second configuration information includes identification information corresponding to the second group of cell CCO configuration information and/or identification information corresponding to the second group of SSB CCO configuration information. The second group of cell CCO configuration information and/or the second group of SSB CCO configuration information are/is determined by the second network node.

For example, if the second network node receives at least one group of cell CCO configuration information and/or at least one group of SSB CCO configuration information of the cell 1 that is/are sent by the first network node, the second network node may reject all cell CCO configurations and SSB CCO configurations that are sent by the first network node. The second network node determines one group of cell CCO configuration information and/or one group of SSB CCO configuration information of the cell 1, and uses the group of cell CCO configuration information and/or the group of SSB CCO configuration information as the second configuration information. Alternatively, the second network node receives the at least one group of cell CCO configuration information sent by the first network node. The second network node may determine one group of cell CCO configurations based on the at least one group of cell CCO configuration information, and determine at least one group of SSB CCO configuration information corresponding to the group of cell CCO configuration information. The second network node uses the group of cell CCO configuration information and/or the determined group of SSB CCO configuration information as the second configuration information. For example, the second network node receives cell CCO configuration information 1-1 and cell CCO configuration information 1-2 of the cell 1 and cell CCO configuration information 2-1 and cell CCO configuration information 2-2 of the cell 2 that are sent by the first network node. The second configuration information sent by the second network node may include the accepted cell CCO configuration information 1-1 of the cell 1 and the determined cell CCO configuration information of the cell 2. In a possible example, details are as follows:

The first configuration information sent by the first network node to the second network node may be shown in Table 4:

TABLE 4

| >Cell info cell information | Cell 1 |
| >>Coverage Modification Index Coverage modification index | 1-1 |
| >>Cell CCO Configuration information | |
| >>Coverage Modification Index Coverage modification index | 1-2 |
| Cell CCO Configuration information | |
| >Cell info | Cell 2 |
| >> Coverage Modification Index | 2-1 |
| >>Cell CCO Configuration information | |
| >> Coverage Modification Index | 2-2 |
| >>Cell CCO Configuration information | |

The second configuration information sent by the second network node to the first network node may be shown in Table 5:

TABLE 5

| Agreed Coverage Modification | Agreed coverage modification information |
| >Cell info | Cell 1 |
| >>Coverage Modification Index | 1-1 |
| Recommended coverage modification | Recommended coverage modification information |
| >Cell info | Cell 2 |
| >>Cell CCO Configuration information | |

Optionally, before step S420, the first network node may receive fourth indication information sent by the second network node. The fourth indication information indicates information about a cell coverage state range and/or information about an SSB coverage state range that can be supported by the second network node.

In an implementation, alternatively, step S420 includes: The second network node sends a rejection message or a failure message to the first network node. Optionally, the reject message or the failure message may carry a reject or failure cause. A specific reason may be that a resource is insufficient or the CCO configuration information in the first message cannot be supported.

According to the method in at least one embodiment of this application, in the 5G radio access network system, when some functions of a base station are separated into two network nodes, for example, a CU and a DU, process coordination is performed between the CU and the DU, to implement a function of capacity and coverage optimization.

It may be understood that, in the communication method in at least one embodiment of this application, the first configuration information may include the one or more groups of cell CCO configuration information and/or the one or more groups of SSB CCO configuration information of the one or more cells. In at least one embodiment of this application, an example in which the first configuration information includes the foregoing some configuration information is used for description, and may be extended to a scenario in which the first configuration information includes the one or more groups of cell CCO configuration information and/or the one or more groups of SSB CCO configuration information of the one or more cells.

Figure 5:
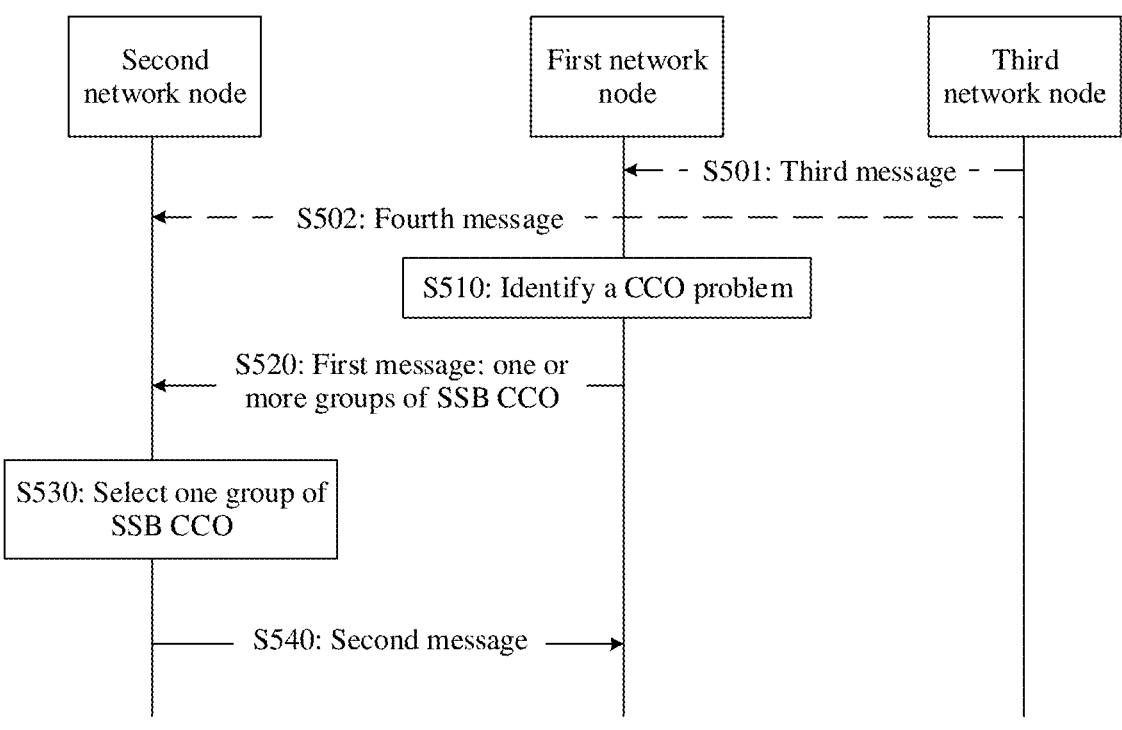
FIG. 5 is another schematic flowchart of a communication method according to at least one embodiment of this application.

Refer to the technical solutions shown in FIG. 3 and FIG. 4. FIG. 5 is a schematic flowchart of a communication method 500 according to at least one embodiment of this application. The communication method shown in FIG. 5 relates to a first network node, a second network node, and a third network node. The first network node may be a CU or a CU-CP described in at least one embodiment corresponding to FIG. 1 or FIG. 2 of this application. The second network node may be a DU described in at least one embodiment corresponding to FIG. 1 or FIG. 2 of this application, or a CU-UP. The third network node may be an operation, administration, and maintenance (OAM) entity. The method 500 includes but is not limited to the following steps.

S510: The first network node identifies a CCO problem.

The first network node may identify the CCO problem based on a message from a terminal device or another network device. The message is at least one of report information such as coverage measurement information, a measurement report, a mobility-related report (for example, a radio link failure report, a successful handover report, or another report), a connection failure report, and a random access report. The another network device may be an OAM or a base station of another cell.

It should be understood that the first network node may identify not only the CCO problem, but also a problem such as a load problem. This application is not limited thereto.

It should be understood that the message may be any message that helps the first network node identify the CCO problem, for example, may be a performance measurement report, or beam and multi-antenna related information. This application is not limited thereto.

Optionally, before the first network node identifies the CCO problem in S510, the method 500 may further include the following steps.

Optional step S501: The first network node receives a third message sent by the third network node, where the third message indicates radio resource configuration information.

For example, the third message may include at least one of the following: an initial cell coverage state, an initial SSB coverage state, a coverage state range, an SSB coverage state range, a mapping relationship between SSB CCO configuration information and a cell coverage state, a mapping relationship between SSB CCO configuration information and cell CCO configuration information, or a mapping relationship between SSB radio resource configuration and an SSB cell coverage state. The first network node may determine the cell CCO configuration and/or the SSB CCO configuration information based on the third message.

Optional step S502: The second network node receives a fourth message sent by the third network node. The third network node may be an operation and management entity (OAM). The fourth message indicates radio resource configuration information.

For example, the fourth message may include at least one of the following: the initial cell coverage state, the initial SSB coverage state, the coverage state range, the SSB coverage state range, the mapping relationship between the SSB CCO configuration information and the cell coverage state, the mapping relationship between the SSB CCO configuration information and the cell CCO configuration information, or the mapping relationship between the SSB radio resource configuration and the SSB cell coverage state. The second network node may determine the cell CCO configuration information and/or the SSB CCO configuration information based on the fourth message.

Optionally, the second network node is managed by the first network node, and the first network node and the second network node belong to a same base station.

S520: The first network node sends a first message to a second network node, where the first message includes first configuration information. The first configuration information may include one or more groups of SSB CCO configuration information determined by the first network node.

Optionally, the first configuration information further includes one or more groups of cell CCO configuration information determined by the first network node.

Optionally, a correspondence between the cell CCO configuration information and the SSB CCO configuration information may be in a one-to-one correspondence, a one-to-many correspondence, a many-to-one correspondence, or a many-to-many correspondence. This is not limited in at least one embodiment of this application.

Optionally, the first message may further include at least one of priority information, gain information, first indication information, second indication information, and third indication information. For specific descriptions of the related information, refer to the descriptions in step S410 in embodiments of this application.

It should be understood that the cell CCO configuration information, the SSB CCO configuration information, the priority information, the gain information, the first indication information, and the second indication information may be included in a same message, for example, the first message, or may be included in different messages sent by the first network node to the second network node. This application is not limited thereto.

It may be understood that if the first network node sends a plurality of groups of cell CCO configuration information and/or a plurality of groups of SSB CCO configuration information to the second network node, the first network node may indicate first index information, and/or second index information, and/or third index information to the second network node.

Optionally, before step S520, the first network node may receive fourth indication information sent by the second network node. The fourth indication information indicates information about a cell coverage state range and/or information about an SSB coverage state range that can be supported by the second network node.

S530: The second network node determines second configuration information based on the first message sent by the first network node.

For example, the second configuration information includes a first group of cell CCO configuration information and/or a first group of SSB CCO configuration information. The one or more groups of beam SSB CCO configuration information determined by the first network node in step S520 include the first group of SSB CCO configuration information. The one or more groups of cell CCO configuration information determined by the first network node include the first group of SSB CCO configuration information.

Optionally, the second configuration information includes index information corresponding to the first group of cell CCO configuration information, and/or index information corresponding to the first group of SSB CCO configuration information. The one or more groups of SSB CCO configuration information determined by the first network node in step S520 include the first group of SSB CCO configuration information. The one or more groups of cell CCO configuration information determined by the first network node include the first group of SSB CCO configuration information.

Optionally, if the first network node does not send the explicit index information to the second network node, the second network node may determine, based on an order of an accepted cell CCO configuration information in the at least one group of cell CCO configuration information, the index information corresponding to the second network node, and/or the second network node may determine, based on an order of the accepted SSB CCO configuration information in the at least one group of SSB CCO configuration information, the index information corresponding to the second network node. For example, the first network node sends three groups of cell CCO configuration information. If the second network node determines that a last group of cell CCO configuration information is the second configuration information, the second network node may indicate, to the first network node, that the index information is 3. Alternatively, the second network node may determine the corresponding index information based on another index calculation manner predefined in a protocol.

Optionally, the second configuration information may further include a second group of cell CCO configuration information and/or a second group of SSB CCO configuration information. The second group of cell CCO configuration information and/or the second group of SSB CCO configuration information are/is determined by the second network node. Alternatively, the second configuration information includes identification information corresponding to the second group of cell CCO configuration information and/or identification information corresponding to the second group of SSB CCO configuration information. The second group of cell CCO configuration information and/or the second group of SSB CCO configuration information are/is determined by the second network node.

For example, if the second network node receives one or more groups of SSB CCO configuration information sent by the first network node, the second network node may reject all SSB CCO configurations sent by the first network node. The second network node determines one group of SSB CCO configuration information based on the first message, and uses the group of SSB CCO configuration information as the second configuration information. The second configuration information is included in a second message, and is sent by the second network node to the first network node. For example, the second network node further identifies a CCO problem based on the report information and/or the first indication information sent by the first network node, to make a decision different from the SSB CCO configuration and/or the cell CCO configuration sent by the first network node.

S540: The first network node receives the second message sent by the second network node. The second message includes the second configuration information.

Optionally, after the first network node receives the second message sent by the second network node, the first network node sends the cell CCO configuration information and/or the SSB CCO configuration information in the second message to a network node of a neighboring cell, so that cells determine configurations that need to be adjusted by the cells.

According to the method in at least one embodiment of this application, in the 5G radio access network system, when some functions of a base station are separated into two network nodes, for example, a CU and a DU, process coordination is performed between the CU and the DU, to implement a function of capacity and coverage optimization.

Figures 6, 7:
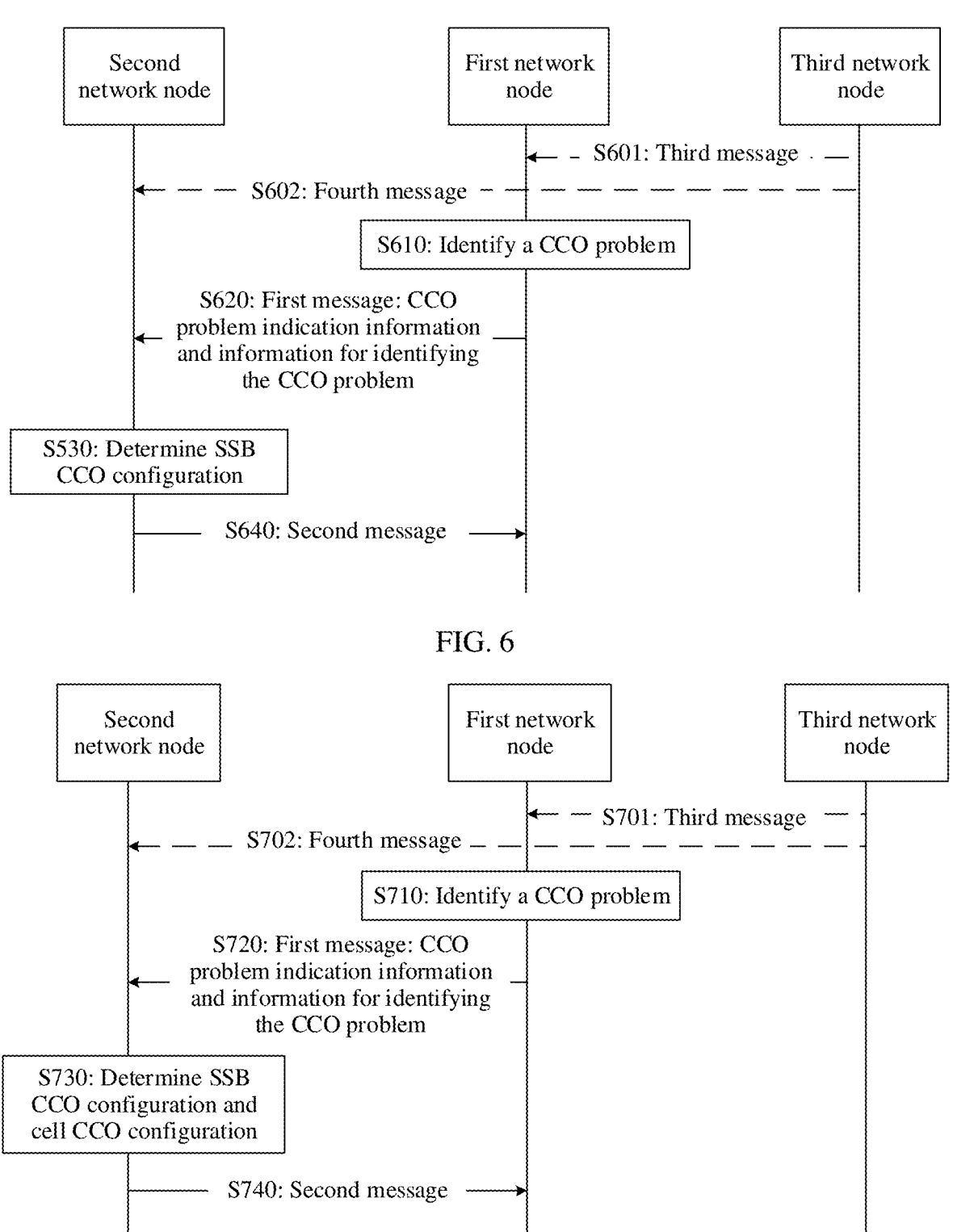
FIG. 6 is still another schematic flowchart of a communication method according to at least one embodiment of this application.
FIG. 7 is yet another schematic flowchart of a communication method according to at least one embodiment of this application.

Refer to the technical solutions shown in FIG. 3 and FIG. 4. FIG. 6 is a schematic flowchart of a communication method 600 according to at least one embodiment of this application. The communication method shown in FIG. 6 relates to a first network node, a second network node, and a third network node. The first network node may be a CU described in at least one embodiment corresponding to FIG. 1 or FIG. 2 of this application, or a CU-CP. The second network node may be a DU described in at least one embodiment corresponding to FIG. 1 or FIG. 2 of this application, or a CU-UP. The third network node may be an OAM entity. The method 600 includes but is not limited to the following steps.

S610: The first network node identifies a CCO problem.

The first network node may identify the CCO problem based on a message from a terminal device or another network device. The message is at least one of other report information such as coverage measurement information, a measurement report, a mobility-related report (for example, a radio link failure report, a successful handover report, or another report), a connection failure report, and a random access report.

It should be understood that the first network node may identify not only the CCO problem, but also another problem such as a load problem. This application is not limited thereto.

It should be understood that the message may be any message that helps the first network node identify the CCO problem, for example, may further be a performance measurement report, or beam and multi-antenna related information. This application is not limited thereto.

Optionally, before the first network node identifies the CCO problem in S610, the method 600 further includes the following steps.

Optional step S601: The first network node receives a third message sent by the third network node. The third message indicates radio resource configuration information. The first network node includes at least one of a packet data convergence protocol layer, a service data adaptation protocol layer, and a radio resource control protocol layer.

For example, the third message may include at least one of the following: an initial cell coverage state, an initial SSB coverage state, a coverage state range, an SSB coverage state range, a mapping relationship between SSB CCO configuration information and a cell coverage state, a mapping relationship between SSB CCO configuration information and cell CCO configuration information, or a mapping relationship between SSB radio resource configuration and an SSB cell coverage state. The first network node may determine the cell CCO configuration and/or the SSB CCO configuration information based on the third message.

Optional step S602: The second network node receives a fourth message sent by the third network node. The third network node may be an operation and management entity (OAM). The fourth message indicates radio resource configuration information. The second network node and the third network node include at least one of a radio link control protocol layer, a media access control layer, and a physical layer.

For example, the fourth message may include at least one of the following: the initial cell coverage state, the initial SSB coverage state, the coverage state range, the SSB coverage state range, the mapping relationship between the SSB CCO configuration information and the cell coverage state, the mapping relationship between the SSB CCO configuration information and the cell CCO configuration information, or the mapping relationship between the SSB radio resource configuration and the SSB cell coverage state. The second network node may determine the cell CCO configuration information and/or the SSB CCO configuration information based on the fourth message.

Optionally, the second network node is managed by the first network node, and the first network node and the second network node belong to a same base station.

S620: The first network node sends a first message to a second network node. The first message includes first configuration information. The first configuration information is cell CCO configuration information determined by the first network node.

Optionally, the first message may further include at least one of first indication information, second indication information, and third indication information. For specific descriptions of the related information, refer to the descriptions in step S410 in embodiments of this application.

It should be understood that the cell CCO configuration information, the first indication information, the second indication information, and the third indication information may be included in a same message, for example, the first message, or may be included in different messages sent by the first network node to the second network node. This application is not limited thereto.

Optionally, before step S620, the second network node may send the third indication information to the first network node, where the third indication information indicates information about a cell coverage state range that can be supported by the second network node.

S630: The second network node determines second configuration information based on the first message sent by the first network node.

For example, after receiving the first message sent by the first network node, the second network node determines the second configuration information based on the first message. The second configuration information includes one group of SSB CCO configuration information, and the group of SSB CCO configuration information is determined by the second network node. For example, the second network node receives the first message sent by the first network node, where the first message includes at least one of the cell CCO configuration information and the first indication information. The second network node determines one group of SSB CCO configuration information based on the first message, and uses the group of SSB CCO configuration information as the second configuration information.

S640: The first network node receives the second message sent by the second network node. The second message includes the second configuration information.

For example, the second network node sends the determined group of SSB CCO configuration information to the first network node.

Optionally, the second message includes cell coverage information corresponding to the group of SSB CCO configuration information.

It should be understood that the cell coverage information may be included in the second message and sent to the first network node together with the second configuration information, or may be separately sent to the first network node by using another message.

Optionally, after the first network node receives the second message sent by the second network node, the first network node sends the second configuration information in the second message to the network node of a neighboring cell, so that cells determine configurations that need to be adjusted by the cells.

According to the method in at least one embodiment of this application, in the 5G radio access network system, when some functions of a base station are separated into two network nodes, for example, a CU and a DU, process coordination is performed between the CU and the DU, to implement a function of capacity and coverage optimization.

Refer to the technical solutions shown in FIG. 3 and FIG. 4. FIG. 7 is a schematic flowchart of a communication method 700 according to at least one embodiment of this application. The communication method shown in FIG. 7 relates to a first network node, a second network node, and a third network node. The first network node may be a CU described in at least one embodiment corresponding to FIG. 1 or FIG. 2 of this application, or a CU-CP. The second network node may be a DU described in at least one embodiment corresponding to FIG. 1 or FIG. 2 of this application, or a CU-UP. The third network node may be an OAM entity. The method 700 includes but is not limited to the following steps.

The first network node may identify the CCO problem based on a message from a terminal device or another network device. The message is at least one of report information such as coverage measurement information, a measurement report, a mobility-related report (for example, a radio link failure report, a successful handover report, or another report), a connection failure report, and a random access report.

It should be understood that the first network node may identify not only the CCO problem, but also another problem such as a load problem. This application is not limited thereto.

It should be understood that the message may be any message that helps the first network node identify the CCO problem, for example, may further be a performance measurement report, or beam and multi-antenna related information. This application is not limited thereto.

Optionally, before the first network node identifies the CCO problem in S710, the method 700 further includes the following steps.

Optional step S701: The first network node receives a third message sent by the third network node. The third network node may be an operation and management entity (OAM). The third message indicates radio resource configuration information. The first network node includes at least one of a packet data convergence protocol layer, a service data adaptation protocol layer, and a radio resource control protocol layer.

For example, the third message may include at least one of the following: an initial cell coverage state, an initial SSB coverage state, a coverage state range, an SSB coverage state range, a mapping relationship between SSB CCO configuration information and a cell coverage state, a mapping relationship between SSB CCO configuration information and cell CCO configuration information, or a mapping relationship between SSB radio resource configuration and an SSB cell coverage state. The first network node may determine the cell CCO configuration and/or the SSB CCO configuration information based on the third message.

Optional step S702: The second network node receives a fourth message sent by the third network node, where the fourth message indicates radio resource configuration information. The second network node and the third network node include at least one of a radio link control protocol layer, a media access control layer, and a physical layer.

For example, the fourth message may include at least one of the following: the initial cell coverage state, the initial SSB coverage state, the coverage state range, the SSB coverage state range, the mapping relationship between the SSB CCO configuration information and the cell coverage state, the mapping relationship between the SSB CCO configuration information and the cell CCO configuration information, or the mapping relationship between the SSB radio resource configuration and the SSB cell coverage state. The second network node may determine the cell CCO configuration information and/or the SSB CCO configuration information based on the fourth message.

Optionally, the second network node is managed by the first network node.

Optionally, the first network node and the second network node belong to a same base station.

S720: The first network node sends a first message to a second network node.

The first message may include the first indication information, and the first indication information indicates information about a network capacity and coverage problem. For description of the first indication information, refer to the description in step S410. Details are not described herein again.

Optionally, the first message may further include the second indication information, and the second indication information indicates information for identifying the network capacity and coverage problem. For example, the second indication information includes at least one of report information such as coverage measurement information, a measurement report, a mobility-related report (for example, a radio link failure report, a successful handover report, or another report), a connection failure report, and a random access report.

Optionally, the first message further includes the third indication information. For specific descriptions of the related information, refer to the descriptions in step S410 in embodiments of this application.

S730: The second network node determines configuration information of network capacity and coverage optimization based on the first message sent by the first network node.

For example, after receiving the first indication information and/or the second indication information and/or the third indication information sent by the first network node, the second network node determines the SSB CCO configuration information and the cell CCO configuration information based on the information.

S740: The first network node receives a second message sent by the second network node. The second message includes the SSB CCO configuration information and the cell CCO configuration information.

It should be understood that the cell CCO configuration information may be included in the second message and sent to the first network node, or may be separately sent to the first network node by using another message.

Optionally, after the first network node receives the second message sent by the second network node, the first network node sends the SSB CCO configuration information and the cell CCO configuration information, or the cell CCO configuration information in the second message to a network node of a neighboring cell, so that cells determine configurations that need to be adjusted by the cells.

According to the method in at least one embodiment of this application, in the 5G radio access network system, when some functions of a base station are separated into two network nodes, for example, a CU and a DU, process coordination is performed between the CU and the DU, to implement a function of capacity and coverage optimization.

Figure 8:
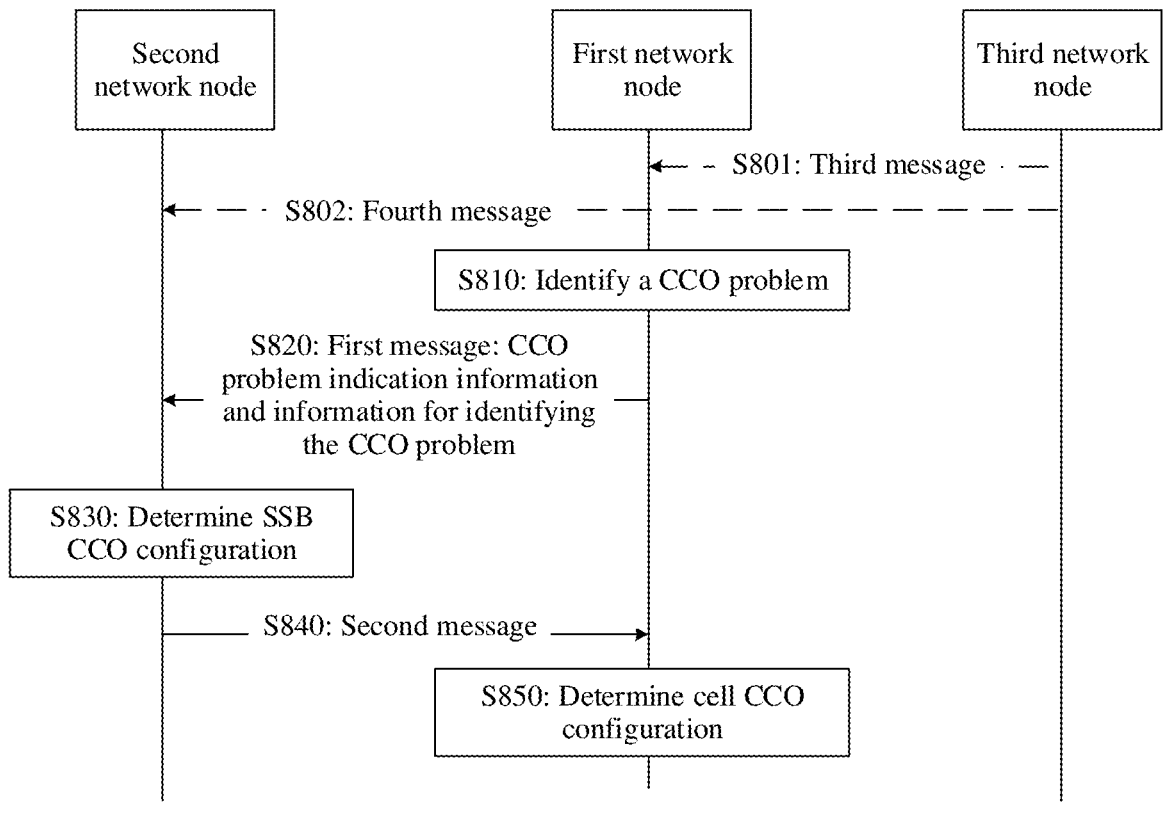
FIG. 8 is still yet another schematic flowchart of a communication method according to at least one embodiment of this application.

Refer to the technical solutions shown in FIG. 3 and FIG. 4. FIG. 8 is a schematic flowchart of a communication method 800 according to at least one embodiment of this application. The communication method shown in FIG. 8 relates to a first network node, a second network node, and a third network node. The first network node may be a CU described in at least one embodiment corresponding to FIG. 1 or FIG. 2 of this application, or a CU-CP. The second network node may be a DU described in at least one embodiment corresponding to FIG. 1 or FIG. 2 of this application, or a CU-UP. The third network node may be an OAM entity. The method 800 includes but is not limited to the following steps.

The first network node may identify the CCO problem based on a message from a terminal device or another network device. The message is at least one of report information such as coverage measurement information, a measurement report, a mobility-related report (for example, a radio link failure report, a successful handover report, or another report), a connection failure report, and a random access report.

It should be understood that the first network node may identify not only the CCO problem, but also another problem such as a load problem. This application is not limited thereto.

It should be understood that the message may be any message that helps the first network node identify the CCO problem, for example, may further be a performance measurement report, or beam and multi-antenna related information. This application is not limited thereto.

Optionally, before the first network node identifies the CCO problem in S810, the method 800 further includes the following steps.

Optional step S801: The first network node receives a third message sent by the third network node. The third network node may be an operation and management entity (OAM). The third message indicates radio resource configuration information. The first network node includes at least one of a packet data convergence protocol layer, a service data adaptation protocol layer, and a radio resource control protocol layer.

For example, the third message may include at least one of the following: an initial cell coverage state, an initial SSB coverage state, a coverage state range, an SSB coverage state range, a mapping relationship between SSB CCO configuration information and a cell coverage state, a mapping relationship between SSB CCO configuration information and cell CCO configuration information, or a mapping relationship between SSB radio resource configuration and an SSB cell coverage state. The first network node may determine the cell CCO configuration and/or the SSB CCO configuration information based on the third message.

Optional step S802: The second network node receives a fourth message sent by the third network node. The third network node may be an operation and management entity (OAM). The fourth message indicates radio resource configuration information. The second network node and the third network node include at least one of a radio link control protocol layer, a media access control layer, and a physical layer.

For example, the fourth message may include at least one of the following: the initial cell coverage state, the initial SSB coverage state, the coverage state range, the SSB coverage state range, the mapping relationship between the SSB CCO configuration information and the cell coverage state, the mapping relationship between the SSB CCO configuration information and the cell CCO configuration information, or the mapping relationship between the SSB radio resource configuration and the SSB cell coverage state. The second network node may determine the cell CCO configuration information and/or the SSB CCO configuration information based on the fourth message.

Optionally, the second network node is managed by the first network node, and the first network node and the second network node belong to a same base station.

S820: The first network node sends a first message to a second network node.

The first message includes the first indication information, and the first indication information indicates information about a network capacity and coverage problem.

For description of the first indication information, refer to the description in step S410. Details are not described herein again.

Optionally, the first message further includes the second indication information, and the second indication information indicates information for identifying the network capacity and coverage problem. For example, the second indication information includes at least one of other report information such as coverage measurement information, a measurement report, a mobility-related report (for example, a radio link failure report, a successful handover report, or another report), a connection failure report, and a random access report.

Optionally, the first message further includes the third indication information. For specific descriptions of the related information, refer to the descriptions in step S410 in embodiments of this application.

S830: The second network node determines configuration information of network capacity and coverage optimization based on the first message sent by the first network node.

For example, after receiving the first indication information and/or the second indication information and/or the third indication information sent by the first network node, the second network node determines the SSB CCO configuration information based on the information.

S840: The first network node receives the second message sent by the second network node. The second message includes the SSB CCO configuration information.

It should be understood that the cell coverage information may be included in the second message and sent to the first network node, or may be separately sent to the first network node by using another message.

S850: The first network node determines the cell CCO configuration information based on the second message.

Optionally, the first network node may receive the mapping relationship that is between the SSB CCO configuration information and the cell CCO configuration information and that is sent by the OAM, so that the first network node determines the corresponding cell CCO configuration information based on the SSB CCO configuration information sent by the second network node.

Optionally, after the first network node receives the second message sent by the second network node, the first network node determines the cell CCO configuration information based on the second message. The first network node may send, to a network node of a neighboring cell, the SSB CCO configuration information in the second message and the cell CCO configuration information determined by the first network node, or the cell CCO configuration information determined by the first network node, so that cells determine configurations that need to be adjusted by the cells.

According to the method in at least one embodiment of this application, in the 5G radio access network system, when some functions of a base station are separated into two network nodes, for example, a CU and a DU, process coordination is performed between the CU and the DU, to implement a function of capacity and coverage optimization.

It may be understood that, to implement functions in the foregoing embodiments, the first network node and the second network node include corresponding hardware structures and/or software modules for performing the functions. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on a particular application scenario and design constraint of the technical solutions.

Figure 9:
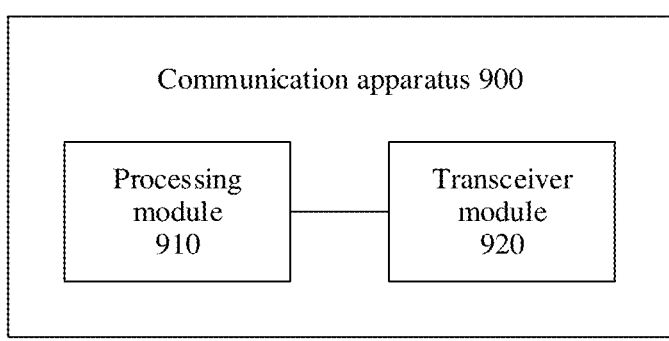
FIG. 9 is a schematic block diagram of a communication apparatus according to at least one embodiment of this application.
Figure 10:
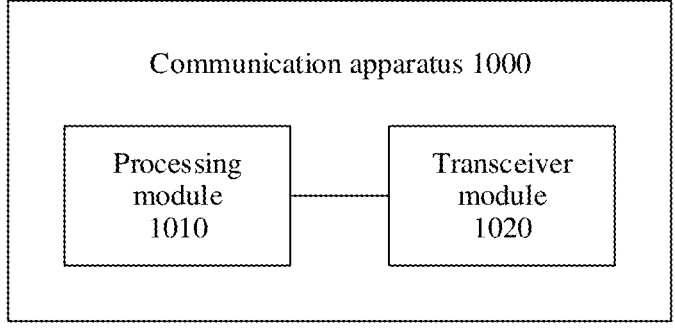
FIG. 10 is another schematic block diagram of a communication apparatus according to at least one embodiment of this application.

FIG. 9 and FIG. 10 are schematic diagrams of possible structures of communication apparatuses according to embodiments of this application. The communication apparatuses may be configured to separately implement functions of the first network node and the second network node in the foregoing method embodiments, and therefore can also implement beneficial effects of the foregoing method embodiments. In at least one embodiment of this application, the communication apparatus may be the first network node and the second network node in the foregoing method embodiments, or may be a module (for example, a chip) used in the first network node and the second network node.

As shown in FIG. 9, a communication apparatus 900 includes a processing module 910 and a transceiver module 920. The communication apparatus 900 is configured to implement a function of the first network node in at least one embodiment corresponding to FIG. 4, FIG. 5, FIG. 6, FIG. 7, or FIG. 8.

When the communication apparatus 900 is configured to implement the function of the first network node in at least one method embodiment shown in FIG. 4, FIG. 5, FIG. 6, FIG. 7, or FIG. 8, for example, details are as follows:

The processing module 910 is configured to determine one or more groups of cell CCO configuration information and/or one or more groups of SSB CCO configuration information.

Optionally, the processing module 910 is further configured to identify a CCO problem.

The transceiver module 920 is configured to send a first message to the second network node, where the first message indicates first configuration information. The transceiver module 920 further receives a second message from the second network node, where the second message indicates second configuration information determined based on the first message. The first network node includes at least one of a packet data convergence protocol layer, a service data adaptation protocol layer, and a radio resource control protocol layer. The second network node includes at least one of a radio link control protocol layer, a media access control layer, and a physical layer.

Optionally, the transceiver module 920 is further configured to:

send the one or more groups of SSB CCO configuration information to the second network node; or send the one or more groups of cell CCO configuration information and/or the one or more groups of SSB CCO configuration information to the second network node.

Optionally, the transceiver module 920 is further configured to:

send at least one of priority information, gain information, first indication information, second indication information, or third indication information to the second network node. For specific descriptions of the related information, refer to the descriptions in step S410 in embodiments of this application.

Optionally, the transceiver module 920 is further configured to:

receive a first group of cell CCO configuration information and/or a first group of SSB CCO configuration information sent by the second network node;

receive index information corresponding to the first group of cell CCO configuration information and/or index information corresponding to the first group of SSB CCO configuration information that are/is sent by the second network node;

receive a second group of cell CCO configuration information and/or a second group of SSB CCO configuration information sent by the second network node; and receive identification information corresponding to the second group of cell CCO configuration information and/or the identification information or the index information corresponding to the second group of SSB CCO configuration information that are/is sent by the second network node.

For specific descriptions of the first group and the second group of related information, refer to the descriptions in step S420 in embodiments of this application.

Optionally, the transceiver module 920 is further configured to:

receive radio resource configuration information sent by an OAM. The radio resource configuration information includes at least one of the following: an initial cell coverage state, an initial SSB coverage state, a cell coverage state range, an SSB coverage state range, a mapping relationship between SSB CCO configuration information and a cell coverage state, a mapping relationship between SSB CCO configuration information and cell CCO configuration information, or a mapping relationship between SSB radio resource configuration and an SSB cell coverage state.

As shown in FIG. 10, a communication apparatus 1000 includes a processing module 1010 and a transceiver module 1020. The communication apparatus 1000 is configured to implement a function of the second network node in at least one embodiment corresponding to FIG. 4, FIG. 5, FIG. 6, FIG. 7, or FIG. 8.

When the communication apparatus 1000 is configured to implement the function of the second network node in at least one method embodiment shown in FIG. 4, FIG. 5, FIG. 6, FIG. 7, or FIG. 8, for example:

The transceiver module 1020 is configured to: receive a first message sent by the first network node, where the first message indicates first configuration information; and send a second message to the first network node, where the second message indicates second configuration information determined based on the first message. The first network node includes at least one of a packet data convergence protocol layer, a service data adaptation protocol layer, and a radio resource control protocol layer. The second network node includes at least one of a radio link control protocol layer, a media access control layer, and a physical layer.

Optionally, the transceiver module 1020 is further configured to:

receive one or more groups of SSB CCO configuration information sent by the first network node; or receive one or more groups of cell CCO configuration information and/or one or more groups of SSB CCO configuration information sent by the first network node.

Optionally, the transceiver module 1020 is further configured to:

receive at least one of priority information, gain information, first indication information, second indication information, or third indication information sent by the first network node. For specific descriptions of the related information, refer to the descriptions in step S410 in embodiments of this application.

Optionally, the transceiver module 1020 is further configured to:

send a first group of cell CCO configuration information and/or a first group of SSB CCO configuration information to the first network node;

send, to the first network node, index information corresponding to the first group of cell CCO configuration information, and/or index information corresponding to the first group of SSB CCO configuration information;

send a second group of cell CCO configuration information and/or a second group of SSB CCO configuration information to the first network node; and send, to the first network node, identification information corresponding to the second group of cell CCO configuration information and/or identification information or index information corresponding to the second group of SSB CCO configuration information.

For specific descriptions of the first group and the second group of related information, refer to the descriptions in step S420 in embodiments of this application.

Optionally, the transceiver module 1020 is further configured to:

receive radio resource configuration information sent by an OAM. The radio resource configuration information includes at least one of the following: an initial cell coverage state, an initial SSB coverage state, a cell coverage state range, an SSB coverage state range, a mapping relationship between SSB CCO configuration information and a cell coverage state, a mapping relationship between SSB CCO configuration information and cell CCO configuration information, or a mapping relationship between SSB radio resource configuration and an SSB cell coverage state.

The processing module 1010 is configured to:

determine the first group of cell CCO configuration information and/or the first group of SSB CCO configuration information;

determine the index information corresponding to the first group of the cell CCO configuration information, and/or the index information corresponding to the first group of SSB CCO configuration information;

determine the second group of cell CCO configuration information and/or the second group of SSB CCO configuration information; and determine the identification information corresponding to the second group of cell CCO configuration information and/or the identification information or the index information corresponding to the second group of SSB CCO configuration information.

For specific descriptions of the first group and the second group of related information, refer to the descriptions in step S420 in embodiments of this application.

Figure 11:
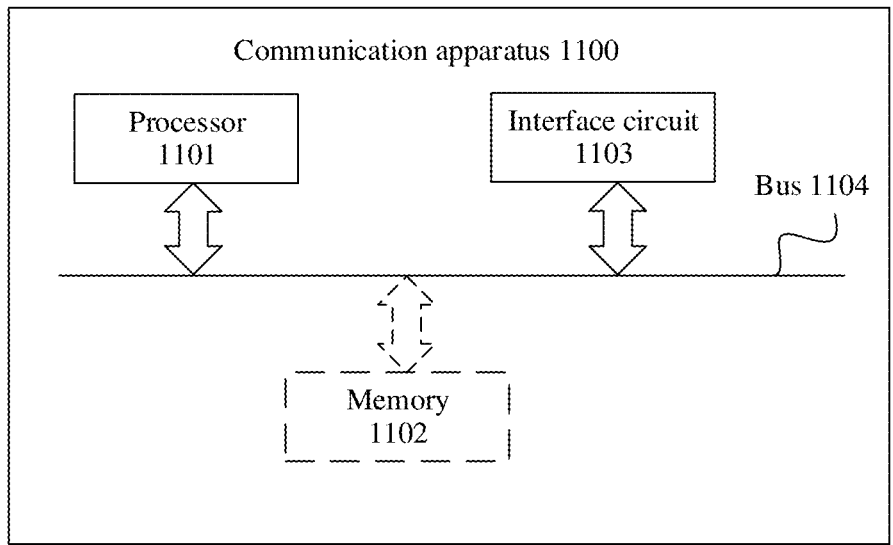
FIG. 11 is still another schematic block diagram of a communication apparatus according to at least one embodiment of this application.

As shown in FIG. 11, a communication apparatus 1100 includes a processor 1101 and an interface circuit 1103. The processor 1101 and the interface circuit 1103 are coupled to each other. It may be understood that the interface circuit 1103 may be a transceiver or an input/output interface.

Optionally, the communication apparatus 1100 may further include a memory 1102, configured to: store instructions executed by the processor 1101, or store input data required by the processor 1101 to run the instructions, or store data generated after the processor 1101 runs the instructions.

When the communication apparatus 1100 is configured to implement the function of the first network node shown in FIG. 4, FIG. 5, FIG. 6, FIG. 7, or FIG. 8, the processor 1101 is configured to implement the function of the processing module 910, and the interface circuit 1103 is configured to implement the function of the transceiver module 920.

When the communication apparatus 1100 is configured to implement the function of the second network node shown in FIG. 4, FIG. 5, FIG. 6, FIG. 7, or FIG. 8, the processor 1101 is configured to implement the function of the processing module 1010, and the interface circuit 1103 is configured to implement the function of the transceiver module 1020.

Optionally, the communication apparatus 1100 further includes a bus 1104. The processor 1101, the interface circuit 1103, and the memory 1102 may communicate with each other through the bus 1104.

At least one embodiment of this application further provides a system chip. The system chip includes an input/output interface, at least one processor, at least one memory, and a bus. The at least one memory is configured to store instructions, and the at least one processor is configured to invoke the instruction in the at least one memory, to perform the operations in the methods in the foregoing aspects.

In embodiments of this application, it should be noted that the method embodiments in embodiments of this application may be applied to a processor, or implemented by a processor. The processor may be an integrated circuit chip with a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in at least one embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

All or some of the foregoing embodiments may be implemented by using software, hardware, firmware, or any combination thereof. When software is used to implement the embodiments, all or a part of the embodiments may be implemented in a form of a computer program product. The computer program product may include one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, applied for a first network node, comprising:

sending a first message to a second network node, wherein the first message comprises first configuration information and first indication information, and the first indication information indicates a network capacity and coverage optimization issue; and receiving a second message from the second network node, wherein the second message comprises second configuration information determined based on the first message, wherein the first network node comprises at least one of a packet data convergence protocol layer, a service data adaptation protocol layer, or a radio resource control protocol layer, the second network node comprises at least one of a radio link control protocol layer, a media access control layer, or a physical layer, and the second configuration information comprises a second group of cell capacity and coverage optimization (cell CCO) configuration information and a second group of beam synchronization signal block capacity and coverage optimization (SSB CCO) configuration information, and the second group of cell CCO configuration information and the second group of SSB CCO configuration information are determined by the second network node.

2. The communication method according to claim 1, wherein the first configuration information comprises one or more groups of SSB CCO configuration information determined by the first network node.

3. The communication method according to claim 1, wherein the first configuration information comprises one or more groups of cell CCO configuration information determined by the first network node.

4. The communication method according to claim 1, wherein the first message further comprises priority information; and at least one of the first configuration information comprises one or more groups of SSB CCO configuration information determined by the first network node, and the priority information indicates a priority of the one or more groups of SSB CCO configuration information, or the first configuration information comprises one or more groups of cell CCO configuration information determined by the first network node, and the priority information indicates a priority of the one or more groups of cell CCO configuration information.

5. The communication method according to claim 1, wherein the first message further comprises second indication information, and the second indication information indicates information for identifying a network capacity and coverage optimization problem.

6. The communication method according to claim 1, wherein the first configuration information comprises at least one of:

one or more groups of SSB CCO configuration information determined by the first network node, or one or more groups of cell CCO configuration information determined by the first network node; and the second configuration information comprises:

at least one of a first group of cell CCO configuration information among the one or more groups of cell CCO configuration information determined by the first network node, or a first group of SSB CCO configuration information among the one or more groups of SSB CCO configuration information determined by the first network node; or at least one of identification information corresponding to a first group of cell CCO configuration information among the one or more groups of cell CCO configuration information determined by the first network node, or identification information corresponding to a first group of SSB CCO configuration information among the one or more groups of SSB CCO configuration information determined by the first network node.

7. An apparatus, comprising:

at least one processor; and a memory storing instructions executable by the at least one processor, wherein when executed by the at least one processor, the instructions cause the apparatus to perform operations comprising:

sending a first message to a second network node, wherein the first message comprises first configuration information and first indication information, and the first indication information indicates a network capacity and coverage optimization issue; and receiving a second message from the second network node, wherein the second message comprises second configuration information determined based on the first message, the apparatus comprises at least one of a packet data convergence protocol layer, a service data adaptation protocol layer, or a radio resource control protocol layer, the second network node comprises at least one of a radio link control protocol layer, a media access control layer, or a physical layer, and the second configuration information comprises a second group of cell capacity and coverage optimization (cell CCO) configuration information and a second group of beam synchronization signal block capacity and coverage optimization (SSB CCO) configuration information, and the second group of cell CCO configuration information and the second group of SSB CCO configuration information are determined by the second network node.

8. The apparatus according to claim 7, wherein the first configuration information comprises one or more groups of SSB CCO configuration information determined by the apparatus.

9. The apparatus according to claim 7, wherein the first configuration information comprises one or more groups of cell CCO configuration information determined by the apparatus.

10. The apparatus according to claim 7, wherein the first message further comprises priority information; and at least one of the first configuration information comprises one or more groups of SSB CCO configuration information determined by the apparatus, and the priority information indicates a priority of the one or more groups of SSB CCO configuration information, or the first configuration information comprises one or more groups of cell CCO configuration information determined by the apparatus, and the priority information indicates a priority of the one or more groups of cell CCO configuration information.

11. The apparatus according to claim 7, wherein the first message further comprises second indication information, and the second indication information indicates information for identifying a network capacity and coverage optimization problem.

12. The apparatus according to claim 7, wherein the first configuration information comprises at least one of:

one or more groups of SSB CCO configuration information determined by the apparatus, or one or more groups of cell CCO configuration information determined by the apparatus; and the second configuration information comprises:

at least one of a first group of cell CCO configuration information among the one or more groups of cell CCO configuration information determined by the apparatus, or a first group of SSB CCO configuration information among the one or more groups of SSB CCO configuration information determined by the apparatus; or at least one of identification information corresponding to a first group of cell CCO configuration information among the one or more groups of cell CCO configuration information determined by the apparatus, or identification information corresponding to a first group of SSB CCO configuration information among the one or more groups of SSB CCO configuration information determined by the apparatus.

13. An apparatus, comprising:

at least one processor; and a memory storing instructions executable by the at least one processor, wherein when executed by the at least one processor, the instructions cause the apparatus to perform operations comprising:

receiving a first message sent by a first network node, wherein the first message comprises first configuration information and first indication information, and the first indication information indicates a network capacity and coverage optimization issue; and sending a second message to the first network node, wherein the second message comprises second configuration information determined based on the first message, the first network node comprises at least one of a packet data convergence protocol layer, a service data adaptation protocol layer, or a radio resource control protocol layer, the apparatus comprises at least one of a radio link control protocol layer, a media access control layer, or a physical layer, and the second configuration information comprises a second group of cell capacity and coverage optimization (cell CCO) configuration information and a second group of beam synchronization signal block capacity and coverage optimization (SSB CCO) configuration information, and the second group of cell CCO configuration information and the second group of SSB CCO configuration information are determined by the apparatus.

14. The apparatus according to claim 13, wherein the first configuration information comprises one or more groups of SSB CCO configuration information determined by the first network node.

15. The apparatus according to claim 13, wherein the first configuration information further comprises one or more groups of cell configuration information determined by the first network node.

16. The apparatus according to claim 13, wherein the first message further comprises priority information; and at least one of the first configuration information comprises one or more groups of SSB CCO configuration information determined by the first network node, and the priority information indicates a priority of the one or more groups of SSB CCO configuration information, or the first configuration information further comprises one or more groups of cell CCO configuration information determined by the first network node, and the priority information indicates a priority of the one or more groups of cell CCO configuration information.

17. The apparatus according to claim 13, wherein the first message further comprises second indication information, and the second indication information indicates information for identifying a network capacity and coverage optimization problem.

18. The communication method according to claim 1, wherein the first network node and the second network node belong to a same base station.

19. The apparatus according to claim 7, wherein the apparatus and the second network node belong to a same base station.

20. The apparatus according to claim 13, wherein the first network node and the apparatus belong to a same base station.

* * * * *